J. H. KNIGHT.
SOIL PULVERIZING DEVICE.
APPLICATION FILED SEPT. 28, 1918.
1,388,953.
Patented Aug. 30, 1921.
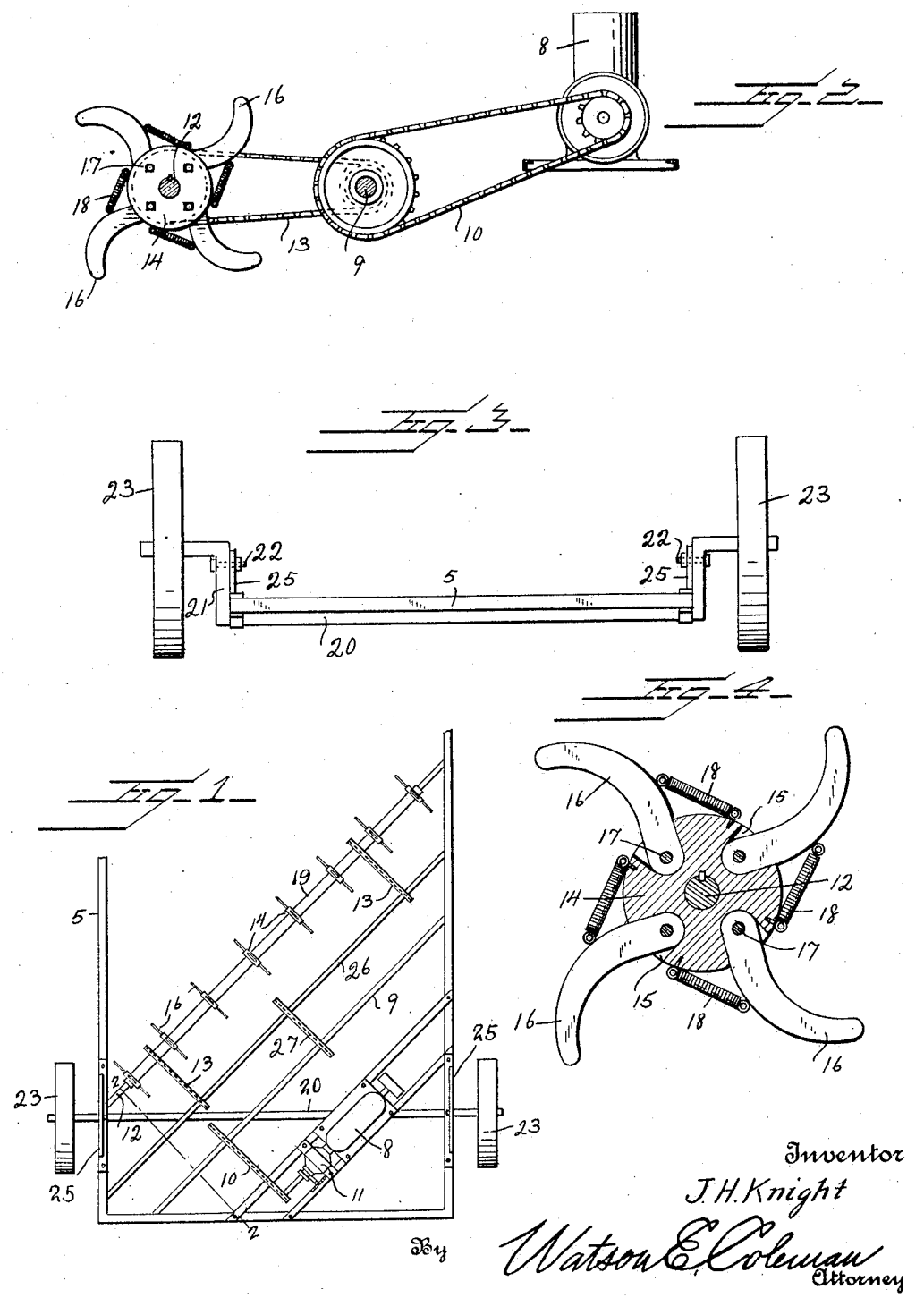
Inventor
J. H. Knight
By Watson E. Coleman
Attorney

UNITED STATES PATENT OFFICE.

JOHN H. KNIGHT, OF WEST PALM BEACH, FLORIDA; LAURA DAISY KNIGHT ADMINISTRATRIX OF SAID JOHN H. KNIGHT, DECEASED.

SOIL-PULVERIZING DEVICE.

1,388,953.  Specification of Letters Patent.  Patented Aug. 30, 1921.

Application filed September 28, 1918. Serial No. 256,113.

*To all whom it may concern:*

Be it known that I, JOHN H. KNIGHT, a citizen of the United States, residing at West Palm Beach, in the county of Palm Beach and State of Florida, have invented certain new and useful Improvements in Soil-Pulverizing Devices, of which the following is a specification, reference being had to the accompanying drawings.

This invention relates to an improved soil pulverizing device, and has for its primary object to provide means for thoroughly breaking up or pulverizing the soil and uprooting weeds, quack or saw grass, and similar growths.

It is also a more particular object of the invention to provide means for the above purpose embodying a plurality of rotatably mounted soil pulverizing members each having a plurality of soil engaging fingers, and means for automatically relieving the fingers of grass, weeds, or other trash collected thereby.

And it is a further general object of my invention to provide a machine for the above purpose which is relatively simple in its construction, strong and durable, and highly efficient and reliable for the purpose in view.

With the above and other objects in view, the invention consists in the improved construction, combination and relative arrangement of the several parts as will be hereinafter more fully described, subsequently claimed and illustrated in the accompanying drawings in which similar reference characters designate corresponding parts throughout the several views, and wherein:—

Figure 1 is a fragmentary plan view illustrating an embodiment of my invention;

Fig. 2 is an enlarged section taken on the line 2—2 of Fig. 1;

Fig. 3 is a rear end elevation of the frame illustrating the adjustable supporting axle therefor; and Fig. 4 is a fragmentary sectional view through one of the soil pulverizing members.

As disclosed in the accompanying drawings, 5 denotes a frame having a suitable engine or motor 8 mounted in an end portion thereof, the motor shaft extending at an angle of substantially 45° with respect to the frame. In parallel relation to the engine shaft, and spaced therefrom, a line shaft 9 is mounted in suitable bearings and is connected by means of the endless chain 10 to the motor shaft through the medium of suitable sprockets which may be of any desired ratio so that rotation will be transmitted to the shaft 9 at a predetermined speed with respect to the speed of the engine. A suitable clutch, indicated at 11, is interposed between the driven shaft and the power shaft of the engine.

A second shaft 12 is mounted in the frame and in parallel relation to the shaft 9, said shaft 9 being connected by the drive chains 13 with an additional or intermediate line shaft 26. This shaft 26 is connected by a chain 27 with the shaft 9. Upon the shaft 12, a plurality of soil pulverizing members are keyed or otherwise suitably fixed. Each of these members includes a disk 14 having a plurality of radially extending sockets 15 gradually increasing in width from their inner ends to the periphery of the disk. In each of these sockets, one end of a curved soil engaging finger 16 is disposed and pivotally secured by means of a bolt 17 extending transversely through the disk. A coil spring 18 is attached at one of its ends to one edge of each finger 16 and has its other end fixed to the periphery of the disk 14. These springs act to yieldingly hold the fingers against pivotal movement with respect to the disk and against one edge of the sockets 15.

Suitable spacing collars or sleeves 19 are arranged upon the shaft 12 between the several soil pulverizing members to prevent their relative longitudinal movement on said shaft. These sleeves or collars may be of any desired length in accordance with the number of soil pulverizing members which may be employed.

The frame 5 is supported at its rear end upon a crank axle 20, the crank ends 21 of the axle extending vertically upward at the opposite sides of the frame. Adjacent to the hub of the wheel spindle on the upper end of the crank ends 21, an inwardly projecting bolt 22 is fixed in the crank arm. These bolts are adapted to be removably engaged through one end of a series of spaced openings in an arcuate plate 25 mounted upon each side of the frame. Nuts are threaded upon the inner ends of these bolts to retain the axle in its adjusted position. It will be readily understood that by adjusting the crank ends of the axle upon the plates 25, the supporting wheels, indicated at 23, will be raised or lowered relative to the frame 5, thus supporting the frame at a desired elevation above the ground surface and determining the depth of penetration of the soil pulverizing fingers 16 into the surface of the soil.

In the operation of the mechanism above described, the frame 5 at its forward end is coupled to a tractor. The motor 8 is started in operation and as the tractor moves across the field, rotation is transmitted from the engine to the shaft 12 through the chains 10, 27, and 13 at a reduced speed. In the rotation of the shaft 12, the fingers 16 of the several soil pulverizing members strike the ground at an angle with relation to the line of movement of the machine, the convex edges of the curved fingers being forwardly disposed and engaging the soil. As these fingers enter the ground, they pivot upon the bolts 17 and move relative to the disk 14 against the contractile action of the springs 18. Thus, when the fingers leave the ground and move upwardly, these springs contract to return the springs to their normal positions and the jar or kick resulting from the contact of the fingers against the edges of the sockets 15 and the disk serves to throw off the trash which may have collected upon the fingers. Thus, the soil pulverizing members will always be free of such accumulations in the operation of the machine. These fingers engaging the saw grass which lies close to the ground, or other rancorous growths, uproots and destroys the same.

From the foregoing description, taken in connection with the accompanying drawings, it is believed that the construction, manner of operation and several advantages of my invention will be clearly and fully understood. The several parts of the machine are simple and durable in their construction and not liable to get out of order. It is to be borne in mind, however, that the invention is not limited to this precise arrangement of the parts nor to the detail construction of the soil pulverizing members, as herein disclosed. These features of my invention, as well as the form, construction and arrangement of the various other elements employed, are susceptible of considerable modification and, accordingly, I reserve the privilege of adopting all such legitimate changes therein as may be fairly embodied within the spirit and scope of the invention as claimed.

I claim:—

A soil pulverizer comprising a disk supported for rotary movement and provided in its periphery with a plurality of circumferentially spaced sockets, each of said sockets gradually increasing in width from its inner end to the periphery of the disk, a plurality of pulverizing fingers, each of said fingers having an end portion extending within a socket and pivotally mounted therein, and a contractile spring coacting with each of the fingers and the disk for constantly urging said finger in one direction and at its limit of movement supported by an end wall of the coacting socket.

In testimony whereof I hereunto affix my signature in the presence of two witnesses.

JOHN H. KNIGHT.

Witnesses:
A. R. ROEBUCK,
L. F. LINCOLN, Jr.